(12) United States Patent
Brandt et al.

(10) Patent No.: US 11,521,081 B2
(45) Date of Patent: Dec. 6, 2022

(54) METHOD FOR THE COMPUTER AIDED CREATION OF DIGITAL RULES FOR MONITORING THE TECHNICAL SYSTEM

(71) Applicant: Siemens Energy Global GmbH & Co. KG, Munich (DE)

(72) Inventors: Sebastian-Philipp Brandt, Munich (DE); Gulnar Mehdi, Germering (DE); Mikhail Roshchin, Munich (DE); Thomas Runkler, Munich (DE)

(73) Assignee: SIEMENS ENERGY GLOBAL GMBH & CO. KG

( * ) Notice: Subject to any disclaimer, the term of this patent is extended or adjusted under 35 U.S.C. 154(b) by 585 days.

(21) Appl. No.: 16/612,981

(22) PCT Filed: May 8, 2018

(86) PCT No.: PCT/EP2018/061814
§ 371 (c)(1),
(2) Date: Nov. 12, 2019

(87) PCT Pub. No.: WO2018/210621
PCT Pub. Date: Nov. 22, 2018

(65) Prior Publication Data
US 2020/0160193 A1 May 21, 2020

(30) Foreign Application Priority Data
May 18, 2017 (EP) .................................... 17171786

(51) Int. Cl.
*G06N 5/02* (2006.01)
*G06F 11/30* (2006.01)

(52) U.S. Cl.
CPC ......... *G06N 5/025* (2013.01); *G06F 11/3013* (2013.01); *G06F 11/3093* (2013.01)

(58) Field of Classification Search
None
See application file for complete search history.

(56) References Cited

U.S. PATENT DOCUMENTS

2020/0160193 A1* 5/2020 Brandt .................. G06F 16/86

FOREIGN PATENT DOCUMENTS

| EP | 3404558 A1 * | 11/2018 | ......... G05B 23/0213 |
| WO | 2005010625 A2 | 2/2005 | |

(Continued)

OTHER PUBLICATIONS

Mehdi Gulnar et al: "Towards Semantic Reasoning in Knowledge Management System", Proceedings of the 4th International Workshop on Artificial Intelligence for Knowledge Management, pp. 1-7, XP055393046, New York City, p. 5, left col. paragraph 3; 2016.

(Continued)

*Primary Examiner* — Isaac Tuku Tecklu
(74) *Attorney, Agent, or Firm* — Schmeiser, Olsen & Watts LLP

(57) ABSTRACT

Provided is a method for the computer-assisted creation of digital rules for monitoring a technical system. In the method, an ontology is used, which contains a plurality of classes including classes of components of the technical system and classes of operating state characteristics of the technical system and contains semantic relations between the classes. By means of a user interface, a user can formulate abstract rules by means of the classes and the semantic relations from the ontology. The abstract rules are converted into concrete rules valid for the specific technical system in an automated manner. The method has the advantage that corresponding rules no longer have to be formulated individually for individual technical systems by the user. Instead, abstract rules only have to be created one time for identical or similar technical systems.

15 Claims, 1 Drawing Sheet

(56) References Cited

FOREIGN PATENT DOCUMENTS

| WO | WO-2005010625 A2 * | 2/2005 | ......... G05B 19/0426 |
|----|--------------------|--------|------------------------|
| WO | 2015074871 A1      | 5/2015 |                        |
| WO | WO-2015074871 A1 * | 5/2015 | ......... G05B 19/0428 |

OTHER PUBLICATIONS

Abele Lisa Theresa: "Resource Monitoring in Industnal Manufacturing Using Knowledge-Based Technologies," pp. 1-227, XP055393038, gefunden am Jul. 21, 2017, gefunden im Internet: URL:www.researchgate.net; p. 3, col. 2; p. 3, last col. p. 53, col. 2-4, p. 57, col. 6, p. 64, col. 1-3, Column [0069]; Figure 8.6; p. 71, Figure 8.8; p. 73, col. 3; p. 73, col. 6-7; p. 73, last col.; p. 74, col. 1; p. 95, col. 1; p. 96; Figure 8.31 p. 102, col. 4-5; p. 111. Column 1S; 2014, Munic, Germany, pp. 1-211.

PCT International Search Report and Written Opinion of International Searching Authority dated Apr. 7, 2018 corresponding to PCT International Application No. PCT/EP2018/061814 filed Aug. 5, 2018.

* cited by examiner

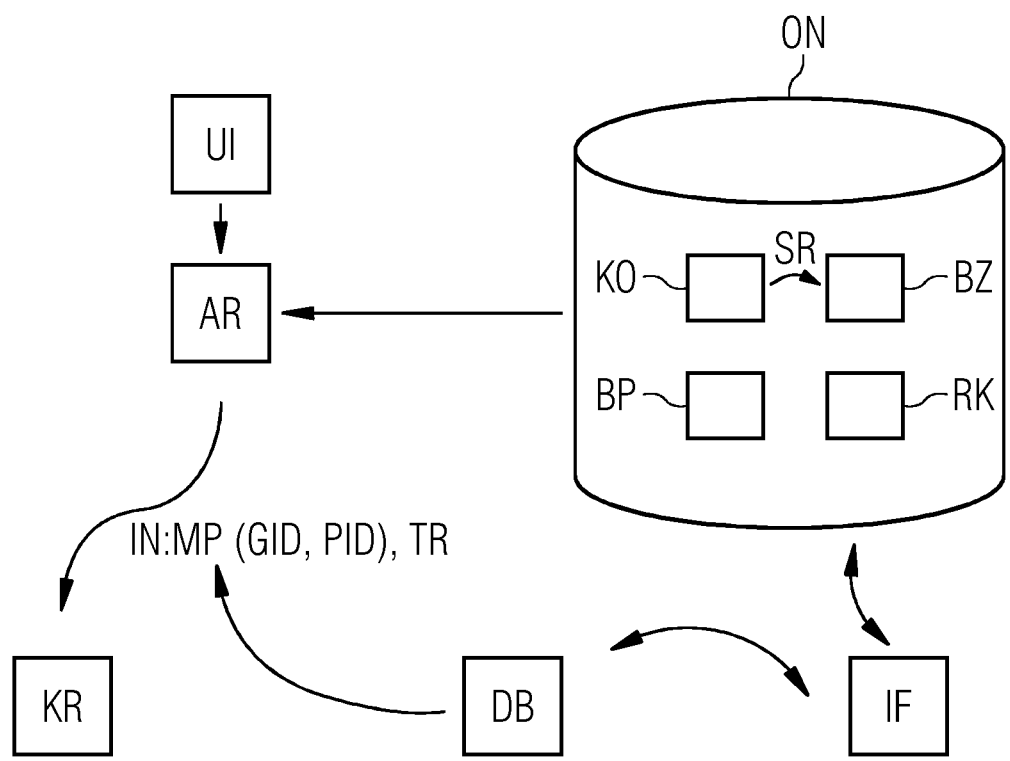

METHOD FOR THE COMPUTER AIDED CREATION OF DIGITAL RULES FOR MONITORING THE TECHNICAL SYSTEM

CROSS-REFERENCE TO RELATED APPLICATIONS

This application claims priority to PCT Application No. PCT/EP2018/061814, having a filing date of May 8, 2018, which is based off of EP Application No. 17171786.1, having a filing date of May 18, 2017, the entire contents both of which are hereby incorporated by reference.

FIELD OF TECHNOLOGY

The following relates to a method and an apparatus for the computer-aided creation of digital rules for monitoring a technical system. Further, the following relates to a method and an apparatus for monitoring a technical system and to a computer program product and a computer program.

BACKGROUND

The prior art discloses rule-based monitoring methods for technical systems in order to diagnose the operation of the technical system and to identify or predict malfunctions in good time. Such rule-based methods involve digital rules being executed by a rules engine, wherein the rules take specific criteria as a basis for identifying irregularities in the operation of the technical system and for example outputting appropriate warnings.

Rule-based methods for monitoring technical systems are specifically matched to the components of the system to be monitored, i.e. device identifications specific to the technical system are used to denote the components in the digital rules. Accordingly, rule-based methods are always individually designed for the applicable technical system and cannot readily be transferred to another technical system, even if the latter has the same or a similar design.

SUMMARY

An aspect relates to provide a method for the computer-aided creation of digital rules for monitoring a technical system that allows rules created by a user to be easily used for multiple technical systems.

The method according to embodiments of the invention is used to create (actual) digital rules in computer-aided fashion for monitoring a technical system. The term monitoring should be understood broadly in this instance and relates to the analysis of a technical system on the basis of operating data. According to embodiments of the invention, an ontology is provided that contains multiple classes comprising classes of components of the technical system and classes of operating state characteristics of the technical system and also semantic relations between the classes. The components are applicable parts of the technical system in this instance. A component can further also relate to the technical system as a whole. The classes of components comprise classes of parts of the technical system without a sensor function and also classes of sensors. Classes of parts without a sensor function are in this instance functional units relating to an operating function that is not directly linked to sensed measured values. Nonetheless, such classes of parts can also contain sensors. The classes of operating state characteristics of the technical system are dependent on state variables of the technical system. Examples of such classes are cited later on.

The semantic relations used in the ontology can be relations known per se, such as e.g. a relation specifying that one class is a subclass of another class, or a relation specifying that one class is part of another class. The definition of further relations on the basis of the classes present in the ontology is within the scope of action of a person skilled in the art in this instance. If the ontology contains e.g. the classes of operating processes that are described later on, a relation can also state that a class of a component is involved in a class of an operating process.

The method according to embodiments of the invention involves a user interface that comprises a visual display being provided, wherein a user can use the user interface to create abstract rule formulations on the basis of the classes and the semantic relations of the ontology by using the visual display. The rule formulations created by the user are stored as digital abstract rules in this instance. In one variant, the digital abstract rules are stored in XML format.

Finally, the digital abstract rules are instantiated for the technical system in automated fashion as digital actual rules by virtue of the classes of components in the digital abstract rules being mapped onto specific device identifications of the technical system by accessing a database containing data about the technical system, and the classes of operating state characteristics being converted into operating state characteristics specific to the technical system that comprise the specific device identifications. A generic rule language is therefore mapped in automated fashion onto a rule language specific to the system to be monitored. This results in the advantage that abstract rules for identical or similar technical systems do not need to be recreated for the specific technical system by the user each time, but rather can be used repeatedly for identical or similar technical systems by means of suitable instantiation.

In one exemplary embodiment, the mapping of the classes of components in the digital abstract rules onto the specific device identifications of the technical system is based on the R2RML language (RDB to RDF Mapping Language). This is a language standard of the W3C consortium in order to map information from relational databases into RDF data records of an ontology.

In a further refinement of the method according to embodiments of the invention, the classes of components contain not only individual components but also classes of functional groups comprising multiple subcomponents. A class of a functional group can relate e.g. to an oil system or a gas path in the technical system.

In one variant, the classes of operating state characteristics contain the following classes:
  at least one class for describing a state variable in the technical system, and/or
  at least one class for describing a minimum value of a state variable in the technical system;
  at least one class for describing a maximum value of a state variable in the technical system;
  at least one class for describing an average value of a state variable in the technical system;
  at least one class for describing a change in a state variable in the technical system over time.

These classes are therefore used to characterize state variables and values dependent thereon. The classes for describing a change over time can indicate different types of changes in this instance, e.g. a severe change, a moderate change or a slow change. Such a class can also be used to characterize longer-term changes in the form of trends.

In a further exemplary embodiment, the classes of the ontology further comprise classes of abstract rules that the user can take into consideration for creating the abstract rule formulations and that are instantiated as applicable actual rules. In this manner, rule blocks for creating the abstract rules are already prescribed for the user, which means that rule creation is simplified.

In a further refinement, the classes of the ontology further comprise classes of operating processes that a user can take into consideration for creating an abstract rule formulation, wherein the instantiation of the digital actual rules involves classes of operating processes in the digital abstract rules being mapped onto specific operating process identifications of the technical system by accessing the above database. These operating process identifications are then contained in the operating state characteristics specific to the technical system. Such operating processes can relate to a starting process or a switch-off process of the technical system, for example. These classes of operating processes extend the options for creating applicable rules.

In a further exemplary embodiment, the method according to embodiments of the invention further involves a query interface being provided that a user can use to query operating data of the technical system on the basis of the classes and the semantic relations of the ontology. This is possible if the above database contains such operating data. If need be, this variant can also be used online during operation of the technical system to access up-to-date operating data.

The method according to embodiments of the invention can be used to create rules for any technical systems. In particular, the technical system to be monitored can be an electrical power generation installation or an electrical power grid or a turbine, such as e.g. a gas turbine, or an automation installation or a means of transport, such as e.g. a train, or a medical device, such as e.g. a computed tomography scanner or a magnetic resonance imaging scanner. An automation installation should be understood in this instance to mean an industrial installation for the automated performance of processes and in particular for the automated production or manufacture of products.

Embodiments of the invention furthermore relates to a method for monitoring a technical system, wherein digital actual rules are produced using the method according to embodiments of the invention that have just been described or one or more variants of said method and are subsequently executed using a rules engine on the technical system for the purpose of monitoring the latter.

Embodiments of the invention furthermore relates to an apparatus for the computer-aided creation of digital rules for monitoring a technical system, wherein the apparatus is designed such that during operation it performs the method according to embodiments of the invention for creating digital rules or one or more variants of said method.

Furthermore, embodiments of the invention relates to an apparatus for monitoring a technical system that is configured to perform the method described above for monitoring a technical system.

Embodiments of the invention furthermore relates to a computer program product (non-transitory computer readable storage medium having instructions, which when executed by a processor, perform actions) having a program code stored on a machine-readable carrier for performing the method according to embodiments of the invention for creating digital rules or for performing the method according to embodiments of the invention for monitoring a technical system when the program code is executed on a computer.

Further, embodiments of the invention comprises a computer program having a program code for performing the method according to embodiments of the invention for creating digital rules or for performing the method according to embodiments of the invention for monitoring a technical system when the program code is executed on a computer.

BRIEF DESCRIPTION

Some of the embodiments will be described in detail, with reference to the following figures, wherein like designations denote like members, wherein:

FIG. 1 is a schematic depiction showing steps of a variant of the method.

DETAILED DESCRIPTION

The method described with reference to FIG. 1 is used for the computer-aided creation of rules for a specific technical system in order to use these rules to monitor the operation of the technical system. The aim in this instance is to provide a user with an interface for formulating abstract rules that are then converted into actual rules for the specific technical system.

In accordance with FIG. 1, the method for rule creation involves a user interface UI, which is depicted only schematically, being used that comprises a visual display on a display and that can be used to create abstract rules by means of appropriate user actions, for example performed using a cursor and a computer mouse. These abstract rules are denoted generally by AR in FIG. 1. To create these rules, the method has an implemented ontology ON that describes the applicable domain of the technical system and is based on OWL (Web Ontology Language). In the exemplary embodiment considered in the present case, a gas turbine is considered as the technical system, but embodiments of the invention is not restricted to a technical system of this kind, but rather can also be used for electrical power generation installations, electrical power grids, automation installations, means of transport, medical devices and the like, for example.

The ontology ON contains a multiplicity of classes in a manner known per se. In the example of FIG. 1, the ontology has provision for classes KO of components of the technical system, classes BZ of operating state characteristics of the technical system and classes BP of operating processes in the technical system. Furthermore, the ontology contains classes RK of abstract rules that can be used as blocks for creating the abstract rules AR. The cited classes are indicated merely schematically in FIG. 1 by means of applicable rectangles.

In a manner known per se, there are semantic relations SR between the classes, only one relation being indicated in exemplary fashion in FIG. 1 by means of an appropriate arrow. The semantic relations in this instance specify a link that exists between one class and the other class connected thereto. Depending on the configuration of the ontology, these relations can have different levels of detail. In the example of FIG. 1, the relations contain among other things a relation specifying that one class is a subclass of another class, and a relation specifying that one class is a part from another class. The relations furthermore contain relations stating that a component of the technical system is involved in a specific operating process or in a specific rule. There is also provision for yet further semantic relations, the applicable definition of such relations being within the scope of action of a person skilled in the art.

Examples of classes KO of components in the above ontology ON are parts of a gas turbine, such as e.g. specific rotor blades or specific sensors capturing measurement data, such as e.g. sensors for measuring combustion chamber temperatures or sensors for measuring rotor speeds.

Examples of classes BZ of operating state characteristics are state variables measured in the gas turbine, such as e.g. temperatures or speeds, or minimum values, maximum values and average values of such state variables. A further example of a class BZ of an operating state characteristic is what is known as a temporal trend, which specifies a longer-term trend in a state variable over time. Further, the operating state characteristics can specify increases and decreases in state variables, the increase and the decrease possibly also being able to be classified in regard to whether there is a severe, moderate or slight increase or fall.

Examples of classes BP of operating processes are starting up or shutting down the gas turbine under consideration. A class RK of an abstract rule can prescribe in the manner of a template that there is a specific fault in the gas turbine if measured variables come from a specific range of values.

A user can now use the user interface UI, by accessing the cited classes and semantic relations of the ontology ON, to create different abstract rules AR, which are stored in XML format in the exemplary embodiment under consideration in the present case. An example of an abstract rule of this kind can be that if the average speed of a rotor, as measured by means of a speed sensor, exceeds a predetermined limit over a predetermined period of time and at the same time there is a severe increase in a combustion chamber temperature in the gas turbine over this period of time, a warning is output during the operation of the technical system.

The abstract rules AR created by the user are formulated generically for components of the technical system and then need to be related to actual subassemblies of the system under consideration, i.e. a specific gas turbine in the present case. To achieve this, the abstract rules AR are instantiated in an instantiation step IN, i.e. they are converted into actual rules KR. This involves the classes KO of components and classes BP of operating processes that the abstract rules contain being converted into actual identifications. In particular, the classes KO are assigned to device identifications GID and the classes BP are assigned to process identifications PID, these identifications being specific to the actual gas turbine to be monitored. Mapping MP of generic classes onto actual identifications is therefore performed. Furthermore, the classes BZ of operating state characteristics are converted into actual operating state characteristics in the course of a translation step TR, these characteristics now containing applicable device identifications GID and process identifications PID.

To achieve the mapping MP just described, information from a database DB that specifies actual data of the technical system to be monitored and in particular contains the device identifications and process identifications is accessed. In the variant under consideration in the present case, the mapping is performed on the basis of the language standard R2RML known per se. The result obtained after the instantiation IN is a set of actual rules KR. These rules can then be stored in the technical system to be monitored and can be executed therein using a rules engine, so that the fulfilment of applicable conditions in the rules results in warnings being output or other countermeasures, such as e.g. shutdown of the gas turbine, being initiated.

The architecture of FIG. 1 furthermore provides a query interface IF that uses the query language SPARQL, for example, which is known per se. This query interface can be used by a user to extract information pertaining to the technical system from the database DB by using the concepts from the ontology ON. An example of such a query is the search for all device identifications of sensors that one specific component of the technical system contains and that are involved in the abstract rule "analysis of vibrations in the technical system". If the database contains applicable measured values from the sought sensors, they can be output at the same time. In particular cases, the architecture of FIG. 1 may also be coupled directly to the technical system to be monitored, so that up-to-date measured values can be read via the query interface IF during monitoring of the technical system.

The embodiment of the invention that is described above has a series of advantages. In particular, the semantic model of an ontology is taken as a basis for providing the opportunity to formulate, in a simple manner, abstract rules for monitoring a technical system, these rules automatically being translated into actual rules for the technical system under consideration. The complexity of creating rules is substantially reduced thereby. This has been able to be demonstrated by experiments. During these experiments, users have created applicable rules directly in the specific rule language of the technical system and by using the ontology according to embodiments of the invention. Creation of the abstract rules on the basis of the ontology has been able to be performed much more quickly by the user than on the basis of the actual rule language.

Furthermore, an interface for querying information from the technical system is provided, the generic terms from the ontology being able to be used for the query. This allows a simple search for heterogeneous data sources by using semantic terms from the ontology.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for a computer-aided creation of digital rules for monitoring a technical system, in which:
   an ontology is provided that contains multiple classes comprising classes of components of the technical system and classes of operating state characteristics of the technical system and also semantic relations between the classes;
   a user interface comprising a visual display is provided, wherein a user can use the user interface to create abstract rule formulations on a basis of the classes and the semantic relations of the ontology by using the visual display, rule formulations created by the user being stored as digital abstract rules;
   the digital abstract rules are instantiated for the technical system in an automated fashion as digital actual rules by virtue of the classes of components in the digital abstract rules being mapped onto specific device identifications of the technical system by accessing a database containing data about the technical system, and the classes of operating state characteristics being converted into operating state characteristics specific to the technical system that comprise the specific device identifications, wherein the classes of components comprise classes of function groups comprising multiple subcomponents.

2. The method as claimed in claim 1, wherein the mapping of the classes of components in the digital abstract rules onto the specific device identifications of the technical system is based on an R2RML language.

3. The method as claimed in claim 1, wherein the digital abstract rules are stored in XML.

4. The method as claimed in claim 1, wherein the classes of components of the technical system comprise classes of parts of the technical system without a sensor function and classes of sensors.

5. The method as claimed in claim 1, wherein the classes of operating state characteristics comprise:
   at least one class for describing a state variable in the technical system, and/or
   at least one class for describing a minimum value of the state variable in the technical system;
   at least one class for describing a maximum value of the state variable in the technical system;
   at least one class for describing an average value of the state variable in the technical system;
   at least one class for describing a change in the state variable in the technical system over time.

6. The method as claimed in claim 1, wherein the classes of the ontology further comprise classes of abstract rules that the user can take into consideration for creating the abstract rule formulations and that are instantiated as applicable actual rules.

7. The method as claimed in claim 1, wherein the classes of the ontology further comprise classes of operating processes that the user can take into consideration for creating the abstract rule formulations, wherein the instantiation of the digital actual rules involves classes of operating processes in the digital abstract rules being mapped onto specific operating process identifications of the technical system, which are contained in the operating state characteristics specific to the technical system, by accessing the database.

8. The method as claimed in claim 1, wherein furthermore a query interface is provided that the user can use to query operating data of the technical system on the basis of the classes and the semantic relations of the ontology.

9. The method as claimed in claim 1, wherein the technical system comprises an electrical power generation installation or an electrical power grid or a turbine or an automation installation or a means of transport or a medical device.

10. A method for monitoring the technical system, wherein digital actual rules are produced using a method as claimed in claim 1 and are executed by means of a rules engine on the technical system for a purpose of monitoring the latter.

11. An apparatus comprising a processor for a computer-aided creation of digital rules for monitoring a technical system, wherein the apparatus is designed such that during operation the apparatus performs a method in which:
   an ontology is provided that contains multiple classes comprising classes of components of the technical system and classes of operating state characteristics of the technical system and also semantic relations between the classes;
   a user interface comprising a visual display is provided, wherein a user can use the user interface to create abstract rule formulations on a basis of the classes and the semantic relations of the ontology by using the visual display, rule formulations created by the user being stored as digital abstract rules;
   the digital abstract rules are instantiated for the technical system in an automated fashion as digital actual rules by virtue of the classes of components in the digital abstract rules being mapped onto specific device identifications of the technical system by accessing a database containing data about the technical system, and the classes of operating state characteristics being converted into operating state characteristics specific to the technical system that comprise the specific device identifications wherein the classes of components comprise classes of function groups comprising multiple subcomponents.

12. The apparatus as claimed in claim 11, which is designed such that the method as claimed in claim 2 is performable using the apparatus.

13. An apparatus for monitoring the technical system, wherein the apparatus is configured to perform the method as claimed in claim 10.

14. A computer program product comprising a computer readable hardware storage device having a computer readable program code stored therein, said computer readable program code executable by a processor of a computer system to implement a method, having a program code stored on a machine-readable carrier for performing the method as claimed in claim 1 when the program code is executed on a computer.

15. A computer program having a program code for performing the method as claimed in claim 1 when the program code is executed on a computer.

* * * * *